United States Patent [19]

Hoshina

[11] Patent Number: 4,856,045
[45] Date of Patent: Aug. 8, 1989

[54] DISPLAY TERMINAL FOR A VIDEOPHONE
[75] Inventor: Yuichiro Hoshina, Tokyo, Japan
[73] Assignee: NEC Corporation, Japan
[21] Appl. No.: 241,894
[22] Filed: Sep. 8, 1988
[30] Foreign Application Priority Data
   Sep. 8, 1987 [JP] Japan .................. 62-223066
[51] Int. Cl.⁴ .................. H04M 11/00; H04N 7/14
[52] U.S. Cl. .......................... 379/53; 379/96;
                                       379/376; 379/428; 358/85
[58] Field of Search ............ 379/53, 54, 428, 434,
                                 379/440, 96, 373, 376, 436; 358/85

[56] References Cited
U.S. PATENT DOCUMENTS

| | | | |
|---|---|---|---|
| 3,755,623 | 8/1973 | Cassagne | 379/53 |
| 3,970,792 | 7/1976 | Benham et al. | 379/53 |
| 4,571,456 | 2/1986 | Paulsen et al. | 379/96 |
| 4,715,059 | 12/1987 | Cooper-Hart et al. | 379/53 |

OTHER PUBLICATIONS

Harry, "Telecom '87, USTA National, FOC/LAN, Comdex, etc. Travels", Dec. 1987, Teleconnect, vol. 5, Issue 12, pp. 41, 45.

*Primary Examiner*—Jin F. Ng
*Assistant Examiner*—Wing F. Chan
*Attorney, Agent, or Firm*—Leydig, Voit & Mayer

[57] ABSTRACT

A display terminal for a videophone comprising a movable section provided with a hand set and a video camera, a base section on which the movable section is mounted by a shaft, a detector accommodated in the base section for detecting a ringing signal or an off-hook state of the handset and supplying a detection signal, and a driving section accommodated in the base section for rotating the shaft in response to the detection signal.

19 Claims, 4 Drawing Sheets

DISPLAY TERMINAL FOR A VIDEOPHONE

BACKGROUND OF THE INVENTION

The present invention relates to a videophone for a moving picture and, more particularly, to a display terminal for such a videophone.

A videophone is capable of transmitting not only speeches but also the image of a person who is communicating and is therefore promising ways for implementing communications between persons who are too far apart to readily meet each other. Initially introduced in the communications art for such a purpose was a videophone for a still picture which was inexpensive and simple in construction. In parallel with the progress of video signal coding technology, however, a videophone for a moving picture has recently come to attract increasing attention.

A prior art videophone for a moving picture is generally made up of a coding device and a display device. Although much of an effort has been directed to the miniaturization of the coding device, no special consideration has been given to the display device. Hence, display devices available at the present stage of development are still large size and therefore occupy a disproportionate exclusive space.

SUMMARY OF THE INVENTION

It is therefore an object of the present invention to provide a miniature display terminal for a videophone which needs only a minimum of exclusive space.

A display terminal for a videophone of the present invention comprises a movable section provided with a handset, a video camera, and a display, a base section on which the movable section is mounted by a shaft, detecting means accommodated in the base section for detecting a ringing signal or an off-hook state of the handset to output a detection signal, and a driving section accommodated in the base section for rotating the shaft in response to the detection signal.

The prevent invention further provides a videophone comprising a base section, a movable section, and a hand set. The base section includes a telephone unit connected to detect a ringing signal. The movable section has an image display section and is movably mounted on the base section, the movable section being movable between a resting position and a raised position. The hand set is wired to the telephone unit and has an on-hook state and off-hook state. The videophone further comprises a mechanism for moving the movable section to the raised position when the hand set enters off-hook state or when a ringing signal is detected and for moving the movable section to the resting position when the band set enters the on-hook state and no ringing is detected.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
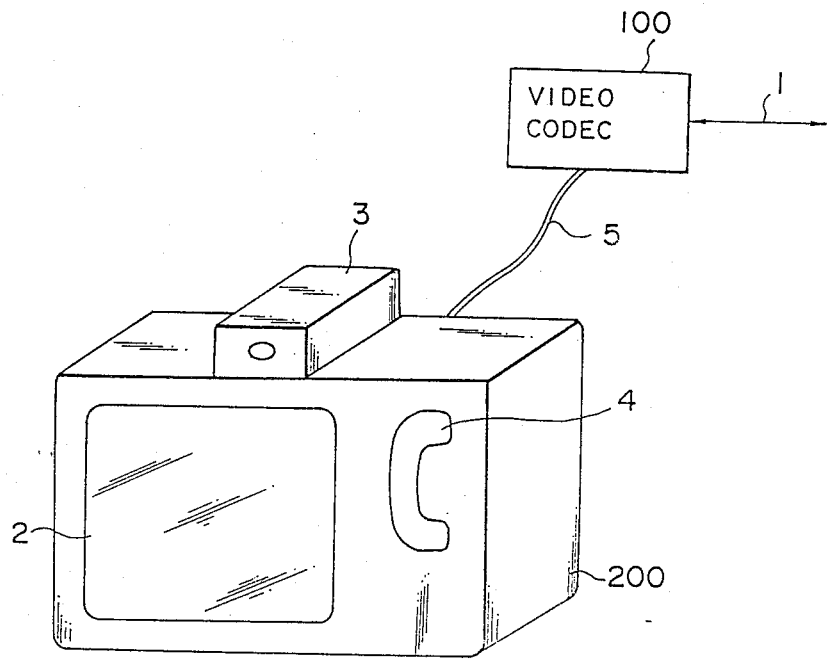
FIG. 1 is a perspective view showing a prior art videophone.

To better understand the present invention, a brief reference will be made to a prior art videophone shown in FIG. 1. In the drawing, the videophone includes a video codec 100 for decoding a coded video signal which comes in over a transmission line 1 into an original video signal and for coding a video signal representative of a scene which it picked up with a video camera into a coded video signal. The videophone further includes a display terminal 200 having a display 2 for displaying a decoded video signal from the codec 100, a video camera 3 for picking up the image of a person and sending it to the codec 100 in the form of a video signal, and a handset 4. A cable 5 interconnects the codec 100 and the display terminal 200 for the interchange of a video signal and a speech signal.

A problem with such a prior art videophone is that the display terminal 200 is bulky and therefore occupies a substantial space, as discussed earlier.

Figure 2:
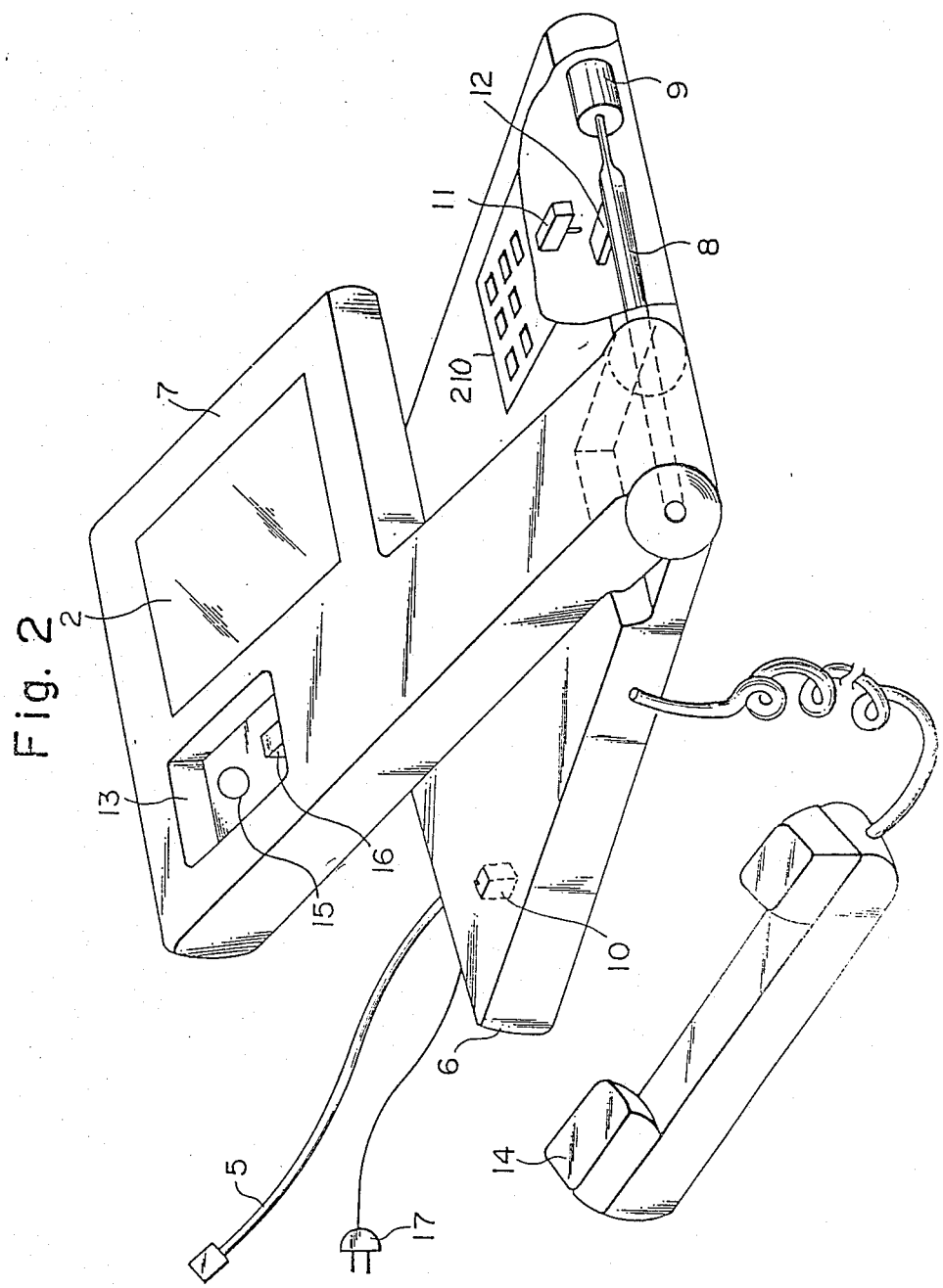
FIG. 2 is a perspective view showing a videophone embodying the present invention.

Referring to FIG. 2, a videophone embodying the present invention is shown in a perspective view. As shown, a display terminal in accordance with the present invention is generally made up of a base section 6 in which a power supply circuit, key switches 210 and other circuits (which will be described) are accommodated, and a movable section 7 rotatably mounted on the base section 6 by a shaft 8. The movable section 7 is provided with a recess or channel 13 for receiving a handset 14, and a display 2. Provided in the recess 13 are a lens 15 of a video camera and a hook switch 16 which is responsive to an off-hook state of the handset 14. On the other hand, the base section 6 is provided with a hook switch 10 for detecting a rising motion of the movable section 7 away from the base section 6, a motor 9 for rotating the shaft 8, and an end detector having a switch 11 and a lever 12 for detecting the end of the rising motion of the movable section 7.

Figure 3:
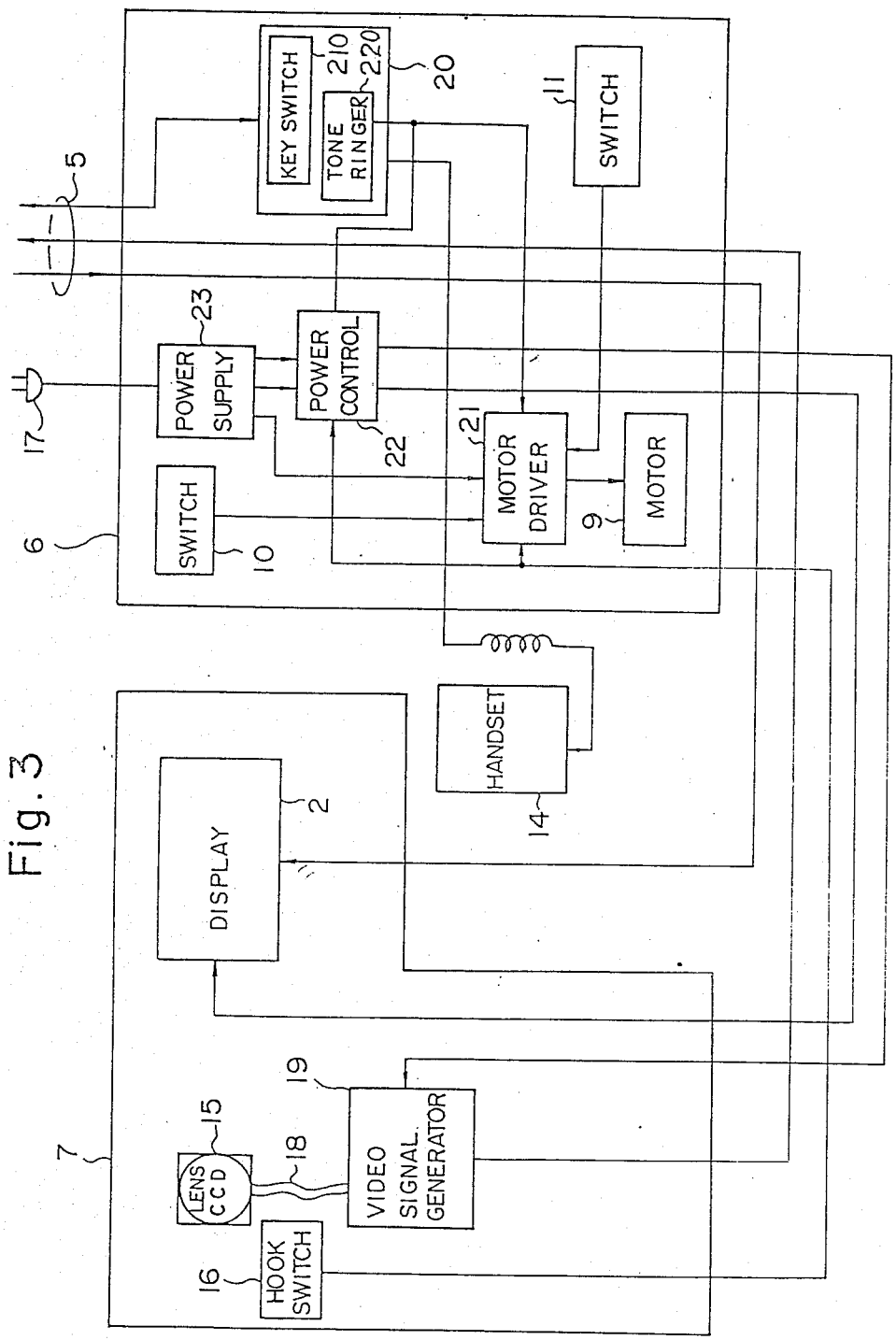
FIG. 3 is a schematic block diagram showing a circuit arrangement in accordance with the present invention.

Referring to FIG. 3, circuit arrangements which are installed in the base section 6 and movable section 7 are shown in detail. In FIG. 3, the same structural elements as those shown in FIG. 2 are designated by like reference numerals. As shown in FIG. 3, a video camera 15 includes a CCD (charge coupled device) array and produces an image signal representative of a scene which it picks up. The image signal is fed to a video signal generator 19 via a cable 18 to be thereby converted into a video signal. As previously stated, the video signal is delivered to the codec 100 (FIG. 1) over the cable 5. The coded output of the codec 100 is sent to the other party over the transmission line 1 (FIG. 1). On the other hand, a video signal coming in over the cable 5 is displayed on the display 2.

A telephone unit 20 includes key switches 210 for setting up a communication line. The telephone unit 20 further includes a tone ringer 220 adapted to detect a ringing signal and to feed it to a motor driver 21 and a power control circuit 22. A power supply circuit 23 supplies the display 2, video signal generator 19 and motor 9 with necessary power. The power control circuit 22 controls the power supply to the display 2 and video signal generator 19 in response to the hook switch 16 and a ringing signal detection signal. More specifically, the power control circuit 22 is made up of an OR gate to which an off-hook detection signal from the switch 16 and the ringing signal detection signal are applied, and a switch opened and closed by an output of the OR gate. In this construction, power is fed to the display 2 and camera 15 only when an off-hook or a ringing signal is detected, whereby power consumption is saved. The motor driver 21 responds to the off-hook detection signal for raising the movable section 7 and responds to on-hook for driving it in such a manner as to lower the movable section 7.

The lens 15 and video signal generator 19 constitute a video camera which per se is well known in the art while the telephone unit 20 and handset 14 constitute an ordinary telephone. It will therefore be needless to describe them any further.

Figure 4:
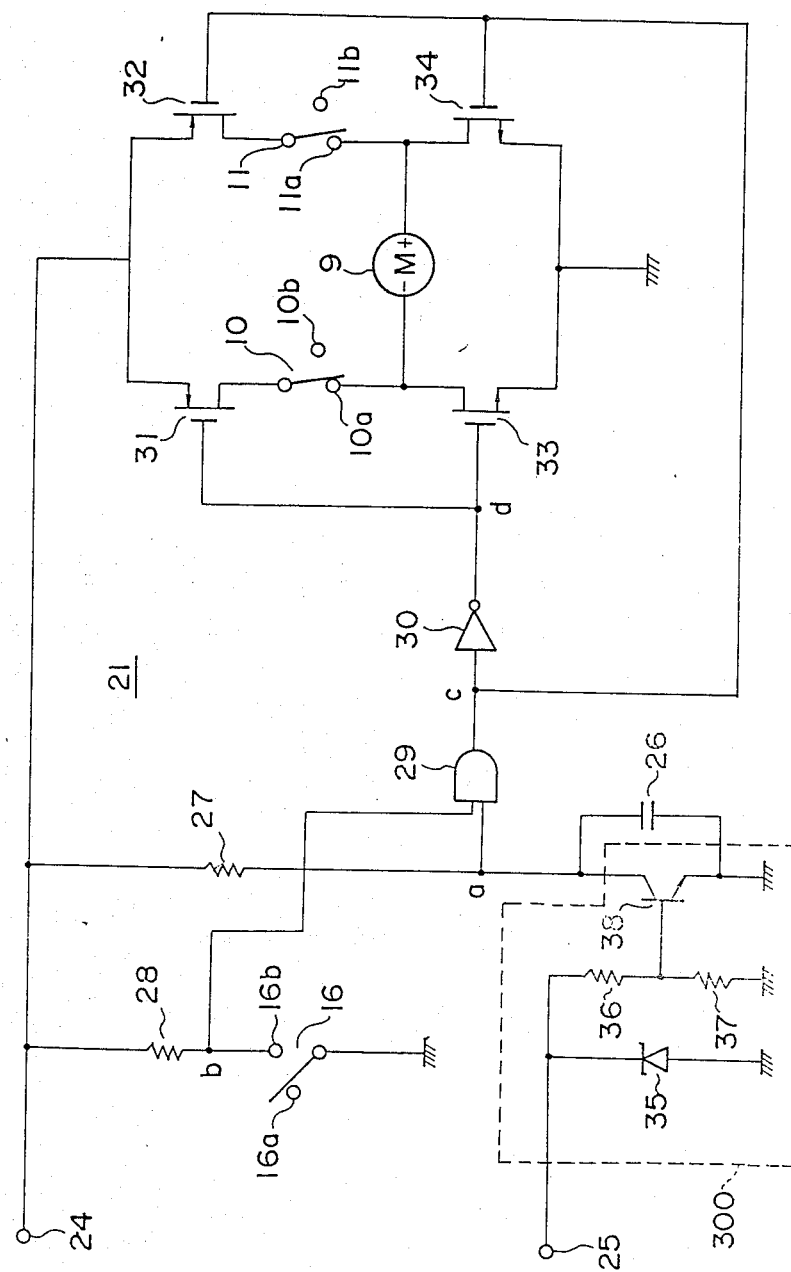
FIG. 4 is a circuit diagram representative of a specific construction of a motor driver which is included in the circuitry of FIG. 3.

Referring to FIG. 4, the motor driver 21 is shown in detail together with the motor 9. As shown, the motor driver 21 includes a terminal 24 for receiving power from the power supply circuit 23 (FIG. 3) and a terminal 25 for receiving a rectified ringing signal which is produced by rectifying the ringing signal (16 hertz) from the telephone unit 20 (FIG. 3).

The switch 10 selects a contact 10b when the movable section 7 is lowered to rest on the base section, or bottom, 6 and a contact 10a when the movable section 7 is raised away from the base section 6. On the other hand, the switch 11 selects a contact 11b when the movable section 7 is fully raised and a contact 11a when otherwise. When a positive and a negative voltage are respectively applied to the positive and negative terminals of the motor 9 (forward direction), the motor 9 is rotated in a direction for raising the movable section 7. Conversely, when the positive and negative voltages are respectively applied to the negative and positive terminals of the motor 9 (reverse direction), the motor 9 is rotated in the other direction to lower the movable section 7.

Further, the hook switch 16 selects a contact 16a when the handset 14 is hooked in the recess 13 and a contact 16b when it is picked up out of the recess 13. A resistor 28 is connected to the hook switch 16 so that a potential appearing on a point b may have a high level when the hook switch 16 selects the contact 16a.

A Zener diode 35, voltage dividing resistors 36 and 37 and a transistor 38 in combination constitute a ringing signal detecting circuit 300. The Zener diode 35 and resistors 36 and 37 are provided with a particular constant which does not activate them in response to speech signals and causes them to turn on the transistor 38 in response to ringing signals. A capacitor 26 and a resistor 27 cooperate to constitute a time constant circuit which maintains a point a at a low level while a ringing signal which is intermittent comes in. An AND gate 29 and an inverter 30 produce a control signal for controllably switching FET's 31 to 34. Implemented by a p-channel FET, each of the FET's 31 and 32 is turned on when a low level is applied to its gate electrode. The FET's 33 and 34 each being implemented by an n-channel FET are turned on when a high level is applied to their gate electrodes.

The operation of the circuitry shown in FIG. 3 will be described assuming a case wherein a call is received by way of example. In such a case, since the movable section 7 is in a lowered position on the base section 6, the switches 16, 10 and 11 have selected the contacts 16a, 10a and 11a, respectively. As a ringing signal comes in through the terminal 25, it is divided by the resistors 36 and 37. The transistor 38 is turned on by the divided voltage to in turn make the point a low level. When the handset 14 is picked up in response to the ringing tone, the hook switch 16 selects the other contact 16b so that the point b becomes a low level. The output of the AND gate 29 changes from a high level to a low level upon the change of the point a or b to a low level, i.e., the AND gate 29 changes its output to a low level as soon as a ringing signal or an off-hook state (pick-up of the handset) is detected. The inverter 30 inverts the output of the AND gate 29 to produce a high level signal. The low level output of the AND gate 29 and the high level output of the inverter 30 are respectively applied to the p- and n-channel FET's 32 and 33 so as to turn them on. Consequently, the voltage applied to the terminal 24 is fed to the motor 9 in such the direction for raising the movable section 7. The power control circuit 22 (FIG. 3) feeds power to the display 2 and video camera 15 when the off-hook or the ringing signal is detected.

When the movable section 7 is fully raised away from the base section 6, the lever 12 (FIG. 2) makes contact with the switch 11 with the result that the switch 11 selects the other contact 11b to thereby interrupt the power supply to the motor 9. The switch 10 selects the contact 10a again as soon as the movable section 7 begins to rise. In this condition, a communication may be held on the basis of voice and picture. When the handset 14 is put in the recess 13 to end the communication, the hook switch 16 selects the contact 16a. At this instant, the high level signals on the points a and b cause the output of the AND gate 29 to change from a low level to a high level because a ringing is not supplied. On the other hand, the power control circuit 22 interrupts the power supply to the display 2 and camera 15 due to the selection of the switch contact 16a. The inverter 30 inverts the high level output of the AND gate 29 to produce a low level output. The high level from the AND gate 29 and the low level from the inverter 30 turn on the p-channel and n-channel FET's 31 and 34, respectively. As a result, the voltage appearing on the terminal 24 is applied to the motor 9 in such a manner as to lower the movable section 7. When the movable section 7 is lowered into contact with the switch 10 of the base section 6, the switch 10 selects the contact 10b again so as to stop the power supply to the motor 9.

When the handset 14 is picked up to originate a call on the telephone unit 20, the motor 9 is driven in such a manner as to raise the movable section 7 as has been the case with the reception of a call. Again, as the handset 14 is put in the recess 13 to end a communication, the motor 9 is rotated in the direction for lowering the movable section 7.

In summary, it will be seen that the present invention provides a display terminal for a videophone which needs a minimum of exclusive space because a movable section thereof having a camera and a display is raised when a bell rings or a handset is picked up and lowered when the handset is hooked.

What is claimed is:

1. A display terminal for a videophone, comprising:
   movable means provided with a handset and a video camera;
   base means on which said movable means is mounted by a shaft;

detecting means accommodated in said base means for detecting a ringing signal or an off-hook state of said handset to output a detection signal; and driving means accommodated in said base section for rotating said shaft in response to the detection signal.

2. A display terminal as claimed in claim 1, wherein said movable means is provided with a recess for receiving said handset.

3. A display terminal as claimed in claim 1, wherein said detecting means comprises a first switch for detecting pick-up of said handset.

4. A display terminal as claimed in claim 2, wherein a lens of said video camera and said first switch are disposed in said recess.

5. A display terminal as claimed in claim 3, wherein said base means is provided with a second switch responsive to a rising motion of said movable means, and a third switch responsive to the end of the rising motion.

6. A display terminal as claimed in claim 5, wherein said driving means comprises a motor for rotating said shaft, and a control circuit responsive to outputs of said second and third switches and the detection signal for applying a drive voltage to said motor to selectively rotate said motor in a forward and a reverse direction.

7. A videophone comprising:
a base section including a telephone unit connected to detect a ringing signal;
a movable section having an image display section and being movably mounted on the base section, the movable section being movable between a resting position and a raised position;
a hand set wired to the telephone unit and having an on-hook state and an off-hook state; and
means for moving the movable section to the raised position when the hand set enters the off-hook state or when a ringing signal is detected and for moving the movable section to the resting position when the hand set enters the on-hook state and no ringing signal is detected.

8. A videophone as set forth in claim 7 wherein the movable section has a recess for receiving the handset.

9. A videophone as set forth in claim 8 wherein a switch responsive to the off-hook state of the handset is provided in the recess.

10. A videophone as set forth in claim 7 wherein the means for moving includes a motor.

11. A videophone as set forth in claim 10 wherein the base section includes a shaft, the movable section is rotatable about the shaft, and the motor is connected to rotate the movable section about the shaft between the resting and raised positions.

12. A videophone as set forth in claim 10 wherein the telephone unit includes a tone ringer connected to feed the ringing signal to the motor.

13. A videophone as set forth in claim 10 further comprising a motor driver and a power supply circuit, the motor driver being connected to receive power form the power supply circuit and further connected to drive the motor to move the movable section between the resting and raised positions.

14. A videophone as set forth in claim 7 further comprising a video camera disposed on the movable section.

15. A videophone as set forth in claim 14 further comprising a power supply circuit connected to supply power to the display and the video camera.

16. A videophone as set forth in claim 15 further comprising a power control circuit connected to supply power from the power supply circuit to the display and the video camera responsive to an off-hook state of the handset or to a detected ringing signal.

17. A videophone as set forth in claim 14 wherein the movable section has a recess for receiving the handset and the video camera includes a lens disposed in the recess.

18. A videophone as set forth in claim 14 wherein the video camera includes a charge coupled device (CCD) array.

19. A videophone as set forth in claim 14 further comprising a video codec which codes and decodes video signals,
the codec being connected to receive a coded first video signal from a transmission line and to decode the first video signal, the codec being further connected to provide the decoded first video signal to the display,
the codec further connected to receive a second video signal from the video camera and to code the second video signal, the codec being further connected to provide the coded second video signal to the transmission line.

* * * * *